(12) United States Patent
Michalak et al.

(10) Patent No.: US 8,566,568 B2
(45) Date of Patent: Oct. 22, 2013

(54) METHOD AND APPARATUS FOR EXECUTING PROCESSOR INSTRUCTIONS BASED ON A DYNAMICALLY ALTERABLE DELAY

(75) Inventors: Gerald Paul Michalak, Cary, NC (US); Kenneth Alan Dockser, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 11/464,839

(22) Filed: Aug. 16, 2006

(65) Prior Publication Data

US 2008/0046692 A1 Feb. 21, 2008

(51) Int. Cl.
*G06F 9/38* (2006.01)
(52) U.S. Cl.
USPC ............................ 712/237; 712/214; 713/320
(58) Field of Classification Search
USPC ........................................ 713/320; 712/237
See application file for complete search history.

(56) References Cited

U.S. PATENT DOCUMENTS

| | | | |
|---|---|---|---|
| 5,155,858 A | | 10/1992 | DeBruler et al. |
| 5,584,031 A | * | 12/1996 | Burch et al. ............... 713/323 |
| 5,706,459 A | | 1/1998 | Atsushi |
| 5,719,800 A | * | 2/1998 | Mittal et al. ............... 713/321 |
| 5,740,417 A | | 4/1998 | Kennedy et al. |
| 5,765,037 A | | 6/1998 | Morrison |
| 5,805,907 A | * | 9/1998 | Loper et al. ............... 713/300 |
| 5,815,698 A | | 9/1998 | Holmann et al. |
| 5,923,892 A | * | 7/1999 | Levy ............................. 712/31 |
| 6,006,325 A | * | 12/1999 | Burger et al. ............... 712/214 |
| 6,029,006 A | * | 2/2000 | Alexander et al. ............ 713/323 |
| 6,282,663 B1 | * | 8/2001 | Khazam ....................... 713/320 |
| 6,338,137 B1 | | 1/2002 | Shiell |

(Continued)

FOREIGN PATENT DOCUMENTS

| | | |
|---|---|---|
| JP | 1049370 A | 2/1989 |
| JP | 07200294 | 8/1995 |

(Continued)

OTHER PUBLICATIONS

"Power-aware control speculation through selective throttling"; Aragon, J.L. Gonzalez, J. Gonzalez, A. ; This paper appears in: High-Performance Computer Architecture, 2003. HPCA-9 2003. Proceedings. The Ninth International Symposium on; Publication Date: Feb. 8-12, 2003; on pp. 103-112.*

(Continued)

*Primary Examiner* — Keith Vicary
(74) *Attorney, Agent, or Firm* — Nicholas J. Pauley; Peter Kamarchik; Joseph Agusta

(57) ABSTRACT

Instruction execution delay is alterable after the system design has been finalized, thus enabling the system to dynamically account for various conditions that impact instruction execution. In some embodiments, the dynamic delay is determined by an application to be executed by the processing system. In other embodiments, the dynamic delay is determined by analyzing the history of previously executed instructions. In yet other embodiments, the dynamic delay is determined by assessing the processing resources available to a given application. Regardless, the delay may be dynamically altered on a per-instruction, multiple instruction, or application basis. Processor instruction execution may be controlled by determining a first delay value for a first set of one or more instructions and a second delay value for a second set of one or more instructions. Execution of the sets of instructions is delayed based on the corresponding delay value.

1 Claim, 6 Drawing Sheets

(56) References Cited

U.S. PATENT DOCUMENTS

| | | | |
|---|---|---|---|
| 6,721,892 B1* | 4/2004 | Osborn et al. | 713/300 |
| 6,826,704 B1* | 11/2004 | Pickett | 713/320 |
| 6,988,213 B1* | 1/2006 | Khazam | 713/320 |
| 7,334,143 B2* | 2/2008 | Atkinson | 713/320 |
| 7,587,580 B2* | 9/2009 | Sartorius et al. | 712/207 |
| 7,627,742 B2* | 12/2009 | Bose et al. | 712/220 |
| 2001/0013095 A1 | 8/2001 | Holmann | |
| 2003/0182542 A1* | 9/2003 | Davies et al. | 712/235 |
| 2004/0064745 A1* | 4/2004 | Kadambi | 713/322 |
| 2005/0235170 A1* | 10/2005 | Atkinson | 713/320 |
| 2006/0064679 A1* | 3/2006 | Ozaki | 717/127 |
| 2006/0174090 A1* | 8/2006 | Sartorius et al. | 712/207 |
| 2009/0182986 A1* | 7/2009 | Schwinn et al. | 712/214 |
| 2009/0210663 A1* | 8/2009 | Sartorius et al. | 712/207 |

FOREIGN PATENT DOCUMENTS

| | | |
|---|---|---|
| JP | 09146769 | 6/1997 |
| JP | 2002189591 A | 7/2002 |
| JP | 2004062427 A | 2/2004 |
| JP | 2004519796 A | 7/2004 |
| RU | 2233470 | 7/2004 |
| RU | 2271035 | 2/2006 |
| TW | 513665 B | 12/2002 |
| TW | 591525 B | 6/2004 |

OTHER PUBLICATIONS

"Saving energy with just in time instruction delivery"; Tejas Karkhanis et al.; Proceedings of the 2002 international symposium on Low power electronics and design; pp. 178-183 Year of Publication: 2002.*

"Control speculation for energy-efficient next-generation superscalar processors"; Aragon, J.L. Gonzalez, J. Gonzalez, A. ; This paper appears in: Computers, IEEE Transactions on; Publication Date: Mar. 2006; vol. 55, Issue: 3; on pp. 281-291.*

"Instruction flow-based front-end throttling for power-awarehigh-performance processors"; Baniasadi, A. Moshovos, A. ; This paper appears in: Low Power Electronics and Design, International Symposium on, 2001.; Publication Date: 2001; on pp. 16-21.*

"Pipeline gating: speculation control for energy reduction"; Manne, S. Klauser, A. Grunwald, D.; This paper appears in: Computer Architecture, 1998. Proceedings. The 25th Annual International Symposium on Publication Date: Jun. 27-Jul. 1, 1998; on pp. 132-141.*

"Confidence estimation for speculation control"; Grunwald, D. Klauser, A. Manne, S. Pleszkun, A. ; This paper appears in: Computer Architecture, 1998. Proceedings. The 25th Annual International Symposium on Publication Date: Jun. 27,-Jul. 1, 1998; on pp. 122-131.*

Salamat et al. (Area-Aware Pipeline Gating for Embedded Processors): PATMOS 2005, LNCS 3728, pp. 601-608, 2005.*

Surendra et al. (Power-Performance Trade-off using Pipeline Delays), pp. 384-386, Asia and South Pacific Design Automation Conference Jan. 27, 2004.*

Wang et al. (Compiler-Based Adaptive Fetch Throttling for Energy-Efficiency) Proc. Int'l Symp. Performance Analysis of Systems and Software, Mar. 2006, pp. 112-119.*

International Search Report—PCT/US07/076151, International Search Authority—European Patent Office—Dec. 10, 2007.

Written Opinion—PCT/US07/076151, International Search Authority—European Patent Office—Dec. 10, 2007.

Taiwanese Search report—096130349—TIPO—Jan. 20, 2011.

Apoory Srivastava, Alvin M. Despain,"Prophetic Branches: A Branch Architecture for Code Compaction and Efficient Execution", Proceedings of the 26th Annual International Symposium on Microarchitecture,[online], Dec. 1993, p. 94-99, [retrieved on Feb. 15, 2012]. Retrieved from the Internet,URL,<http://ieeexplore.ieee.org/stamp/stamp.jsp"tp=&arnumber=282753>.

Pomerene J. H., et al., "Reduction of Branch Delay by Out-Of-Sequence Decoding Under Control of a Decode History Table", IBM Technical Disclosure Bulletin, United States, IBM Corp., Sep. 1982, vol. 25, No. 4, p. 2141.

"Raasch S.E. et al., "A scalable instruction queue design using dependence chains", in: the 29th annual international symposium on Computer architecture, IEEE Computer Society Washington, DC, vol. 30, No. 2 (May 2002). ".

Nakanishi C., et al., "Code Scheduling on a Superscalar Processor SARCH," Technical Report of the Institute of Electronics, Information and Communication Engineers, Japan, Oct. 22, 1992, vol. 92, No. 289, pp. 33-40.

Gross T.R., et al, "Optimizing Delayed Branches", In Proceedings: The 15th Annual Microprogamming Workshop Micro 15, IEEE, pp. 114-120, Dec. 31, 1982.

\* cited by examiner

METHOD AND APPARATUS FOR EXECUTING PROCESSOR INSTRUCTIONS BASED ON A DYNAMICALLY ALTERABLE DELAY

BACKGROUND

1. Field of the Invention

The present invention generally relates to microprocessors, and particularly relates to dynamically delaying instruction execution.

2. Relevant Background

Modern processing systems conventionally include a main or central processor and one or more coprocessors. The main processor offloads certain tasks to the coprocessors. For example, floating-point, arithmetic, graphics, signal-processing, string-processing, encryption, and/or vector-processing tasks can be off-loaded to corresponding coprocessors. The computational load placed on the main processor is lightened by offloading processor-intensive tasks, thus improving system performance.

An instruction offloaded to a coprocessor may be speculative, that is, the main processor has not yet finally resolved whether the instruction should be executed when it is provided to the coprocessor for execution. This often occurs in the context of conditional branch instructions. When a conditional branch instruction is encountered, the processor predicts which path it will take; whether it will jump to a different stream of code (i.e., the branch is taken), or if execution will continue with the instruction after the branch (i.e., the branch is not taken). The processor or coprocessor then speculatively executes one or more instructions associated with the predicted path. When the branch instruction is later resolved, it may be determined that the path was incorrectly predicted, often referred to as a branch misprediction. When a branch misprediction occurs, all instructions in the mispredicted path are discarded or flushed. Power consumption may be adversely affected as any work performed on instructions in the mispredicted path was unnecessary, yet could have been substantial.

To reduce the adverse effects associated with mispredicted branches, conventional coprocessors operate with a fixed instruction execution delay. Instructions received by a conventional coprocessor incur an execution delay corresponding to the fixed delay. As such, execution of instructions received by the coprocessor does not begin until the fixed delay lapses. Once the processor's design is 'frozen', the instruction execution delay cannot be modified without revising the design. Thus, each instruction executed by a conventional coprocessor incurs the same fixed delay without regard to the particular software application being executed nor the environment in which it is run. However, different application types result in different instruction execution predictability. That is, speculative instructions associated with some application types are almost always correctly predicted taken, and thus, speculative instruction execution is fairly reliable because the likelihood of branch misprediction is relatively low.

For example, the inverse transform function employed by a video decoding application is executed for each macro block of every video frame. Conversely, execution of speculative instructions associated with other application types may be less reliable, making the likelihood of execution pipeline flushing higher. For example, the de-blocking and de-ringing filter functions executed by a video decoding application depend on the pixel values of a particular video frame, and are executed less predictably. As a result, a fixed instruction execution delay may hamper processor performance or power when executing speculative instructions associated with applications that have different instruction execution predictabilities.

Instruction execution delay is conventionally fixed to one extreme that enables full speculative instruction execution or to the other extreme that enables no speculative instruction execution. In full speculative instruction execution mode, coprocessors speculatively execute each instruction provided to them without delay and before the instruction has been committed by the main processor. As such, the fixed instruction execution delay is essentially zero. Although this technique is beneficial for performance, it hampers power efficiency when speculative instruction execution becomes unpredictable. For example, highly speculative instructions may be mispredicted often, thus causing a zero-delay coprocessor to frequently execute code unnecessarily. Power efficiency is degraded each time computations associated with a mispredicted instruction are flushed from the execution pipeline. However, performance is enhanced due to the lack of additional startup latency for new instructions issued to the coprocessor.

Conversely, in non-speculative execution configurations, a coprocessor defers instruction execution until the main processor commits the corresponding instruction. Although this technique is beneficial from a power point of view for highly speculative instructions by preventing the execution of instructions which will subsequently be flushed, it hampers system performance due to its additional startup latency. When branches are often predicted correctly, and can be fed continuously to the coprocessor, the long startup latency is hidden and thus performance is not significantly degraded. On the other hand, the non-speculative approach greatly increases the instruction's effective latency when, for example, the processor is waiting for the results from the coprocessor.

SUMMARY OF THE DISCLOSURE

According to the methods and apparatus taught herein, instructions executed in a processing system incur an instruction execution delay that is dynamically alterable. While the delay can be altered to cause either fully-speculative or non-speculative execution, it also can also cause partially-speculative execution where instructions perform some speculative computation but stop execution at a specified stage until the instruction is committed. Furthermore, the delay can be configured to allow fully speculative execution after a set number of cycles in the hope that the speculation will typically be resolved by the time the instruction is ready to update the architected state. Dynamic, runtime execution delay control enables the processing system to account for various changing conditions that impact whether or to what extent instruction execution delay is desirable.

In some embodiments, the dynamic delay is determined by an application to be executed by the processing system. In other embodiments, the dynamic delay is determined by analyzing the history of previously executed instructions. In yet other embodiments, the dynamic delay is determined by assessing processing resources available to a given application. Regardless, the delay may be dynamically altered on a per-instruction, multiple instruction, or application basis.

Processor instruction execution may be controlled by determining a first delay value for a first set of one or more instructions and a second delay value for a second set of one or more instructions. Execution of the sets of instructions is delayed based on the corresponding delay value. A delay determination unit determines the delay values and a processing unit executes the sets of instructions based on the corresponding delay values. The delay determination unit may be included in a main processor or a coprocessor. The processing unit may comprise one or more execution units included in the main processor or a coprocessor.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
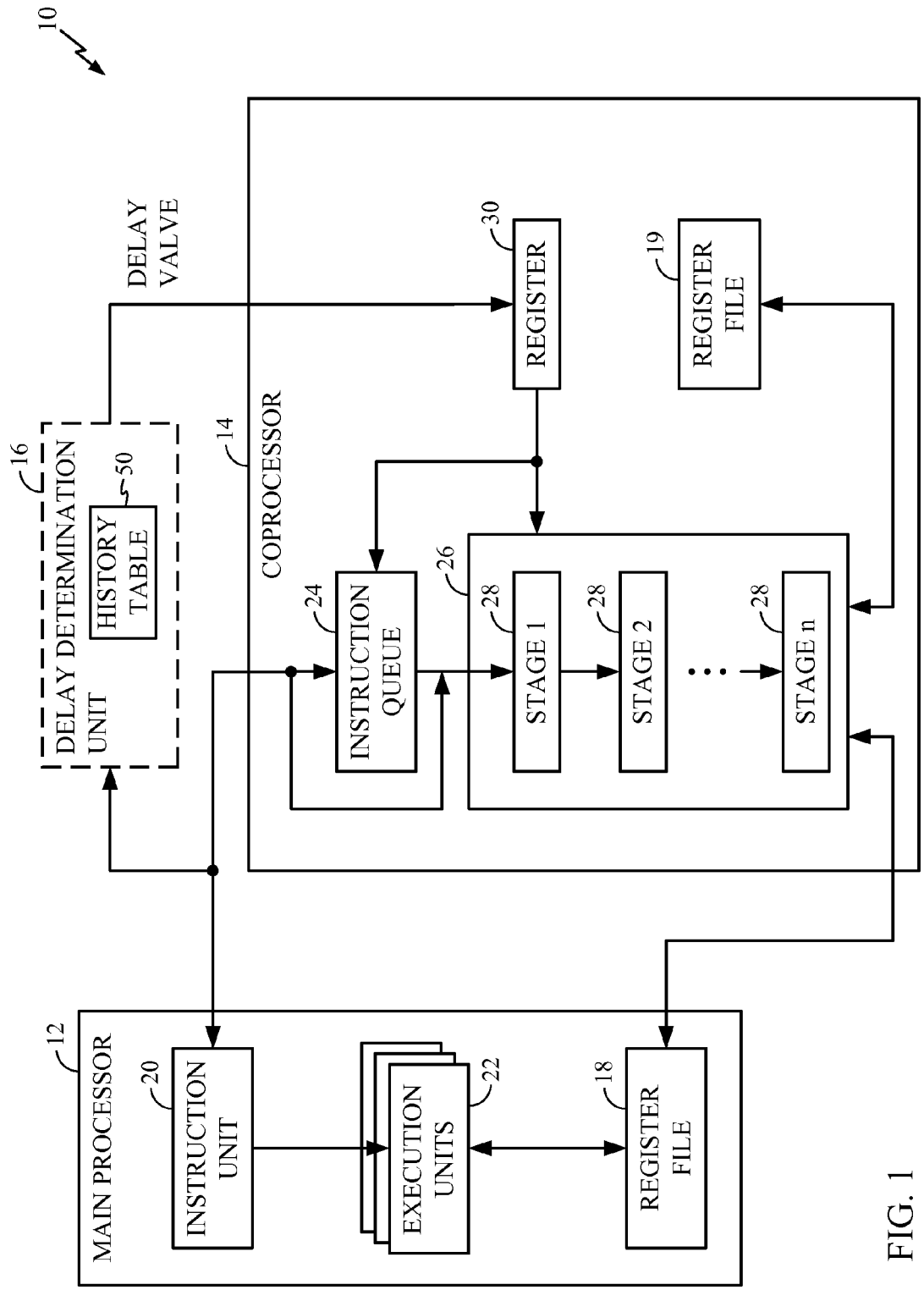
FIG. 1 is a block diagram illustrating an embodiment of a processing system having a delay determination unit.

FIG. 1 illustrates an embodiment of a processing system 10 including a main or central processor 12 and a coprocessor 14. The coprocessor 14 executes instructions provided to it by the main processor 12 based on a dynamic instruction execution delay. That is, the coprocessor delays instruction execution in accordance with the dynamic delay. The capability to alter instruction execution delay after the design phase has been completed enables the processing system 10 to account dynamically for various conditions that impact instruction execution, based on adjusting the dynamic delay accordingly.

In some embodiments, a delay determination unit 16 included in or associated with the main processor 12, the coprocessor 14 or a different coprocessor (not shown) the delay determination unit 16 accounts for the speculative nature of a particular set of one or more instructions to be executed by the coprocessor 14. The delay determination unit 16 accounts for the speculative nature of instructions by altering the instruction execution delay associated with the coprocessor 14 accordingly. Some instructions may be more or less speculative than others, i.e., they are more or less likely to commit, allowing them to update the architected state in the main processor 12 or coprocessor 14. The architected state includes any state visible to the programmer by means of the processor's instruction set. For example, the instruction execution result may be stored in a register file 18 included in or associated with the main processor 12, or in a register file 19 included in or associated with coprocessor 14. As such, each instruction or set of instructions offloaded to the coprocessor 14 may incur an execution delay based on their speculative nature. For example, highly speculative instructions may incur a greater execution delay while less speculative instructions may incur a lesser delay.

In other embodiments, the delay determination unit 16 accounts for the extent of processing resources available to an application to be executed by the processing system 10. That is, the delay determination unit 16 alters the dynamic delay based on processing resources such as processing speed, memory bandwidth, cache size, display capability, battery mode, battery life, power savings mode, and the like. As such, the delay-determination unit 16 enables the processing system 10 to trade-off between system performance and power consumption by altering the execution delay associated with the coprocessor 14 accordingly. For example, if battery life is a concern, the delay determination unit 16 may alter the delay of the coprocessor 14 so that instructions are not executed until first committed by the main processor 12, thus reducing power consumption.

Regardless of the condition that triggers adjustment of the instruction execution delay, the delay may be dynamically altered on a per-instruction, multiple instruction, or application basis. The ability to alter instruction execution delay does not prevent instruction pipeline flushes; rather, it allows delay-based speculative-execution control. The benefit to the user is dynamic power and performance balancing and optimization of the processing system 10.

In more detail, the main processor 12 is communicatively coupled to includes the coprocessor 14. The main processor 12 includes an instruction unit 20, one or more execution units 22, and the register file 18. The instruction unit 20 provides centralized control of instruction flow to the execution units 22 and to the coprocessor 14. The execution units 22, which may include one or more load/store units (not shown), floating point units (not shown), and integer units (not shown) execute instructions dispatched by the instruction unit 20. The register file 18 comprises an array of registers that stage data between memory (not shown) and the functional units of the main processor 12, e.g., the execution units 22. Likewise, the coprocessor's register file 19 comprises an array of registers that stage data between memory (not shown) and the functional units of the coprocessor 14, e.g., execution units 26. The register file 18 may store temporary results before the corresponding instructions are committed by the main processor 12. In such an arrangement, the register file 18 may implement register renaming which enables dynamic mapping of physical register file entries to architected register names. As such, register entries holding temporary results may be renamed when the instructions are committed. Likewise, the coprocessor 14 may store temporary results generated by it until the producing instructions are committed, at which time the register file 19 is updated.

The coprocessor 14 receives instructions offloaded by the instruction unit 20. In some embodiments, the coprocessor 14 is capable of executing coprocessor functions only and cannot fetch instructions from memory (not shown), execute program flow control instructions, perform input/output operations, manage memory, and the like. As such, the main processor 12 fetches instructions for the coprocessor 14 and handles other operations aside from coprocessing functions. In other embodiments, the coprocessor 14 functions more along the lines of a general-purpose processor, carrying out a limited range of additional functions under control of the main processor 12.

Figure 2:
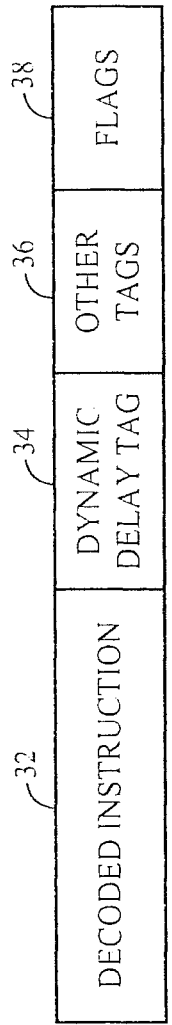
FIG. 2 is a block diagram illustrating an embodiment of an instruction tagged with a dynamic instruction execution delay value.

Regardless, instructions offloaded to the coprocessor 14 may be buffered in an instruction queue 24 for subsequent dispatch to a coprocessor execution unit 26 or may be provided directly to the coprocessor execution unit 26. The coprocessor's instruction queue 24 may reside in the main processor 12 or other places outside of the coprocessor 14. The coprocessor execution unit 26 may comprise a plurality of stages 28 for executing instructions, e.g., decode, register access, execute, and writeback stages. Regardless of the pipelined nature of the coprocessor execution unit 26, each instruction is executed by the coprocessor 14 based on the dynamic delay stored in a register 30. Further, each instruction or set of instructions provided to the coprocessor 14 is associated with its corresponding delay. This association enables the register 30 to be dynamically reprogrammed without losing the delay value(s) assigned to instruction(s) not yet fully executed. As a result, delays associated with instructions moving through the instruction queue 24 and the various execution stages 28 are accessible for subsequent use. In one embodiment, each set of one or more instructions processed by the coprocessor 14 is tagged with its assigned delay as shown in FIG. 2. As such, instructions moving through the coprocessor instruction queue 24 and execution unit 26 comprise a first field 32 containing the decoded instruction, a second field 34 containing the delay value assigned to the instruction, a third field 36 containing optional tags, and a fourth field 38 containing one or more optional flag bits.

Figure 3:
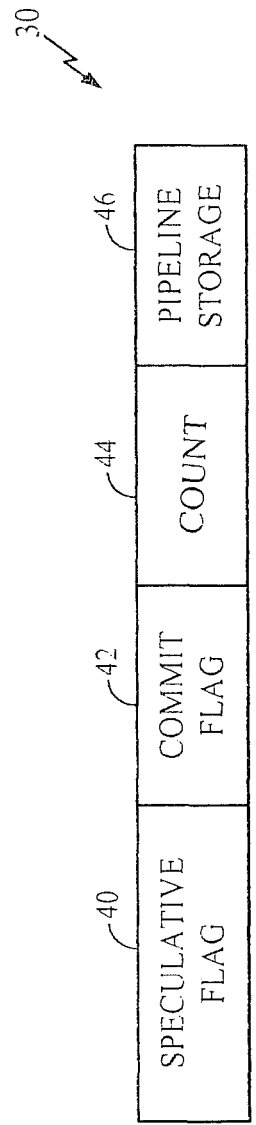
FIG. 3 is a block diagram illustrating an embodiment of a register that stores dynamic instruction execution delay information.

The dynamic instruction execution delay value may be expressed in various forms. These various forms of dynamic instruction execution delay value may be utilized separately or in combination. In one embodiment, the dynamic instruction execution delay corresponds to a speculative instruction execution flag 40 in the register 30, as illustrated in FIG. 3. Instructions are executed speculatively without delay when the speculative instruction execution flag 40 is set. In another embodiment, the dynamic instruction execution delay corresponds to an instruction commit flag 42 in the register 30, as illustrated in FIG. 3. When the instruction commit flag 42 is set, instruction execution is delayed until the corresponding instruction is committed by the main processor 12, i.e., the main processor 12 has finally determined that the instruction should be executed.

In yet another embodiment, the dynamic instruction execution delay corresponds to a processor cycle count field 44 in the register 30, as illustrated in FIG. 3. When the count field 44 is loaded with a value, instruction execution is delayed until a number of processor cycles corresponding to the count field 44 have passed. After a sufficient number of processor cycles have elapsed, instruction execution then may begin, assuming that no other conditions are holding off its execution. In still another embodiment, the dynamic instruction execution delay corresponds to a pipeline stage field 46 in the register 30, as illustrated in FIG. 3. The pipeline stage field 46 indicates a number of coprocessor 14 execution pipeline stages 28 through which instruction execution is processed. Instruction execution stalls at the indicated stage until the main processor 12 commits the corresponding instruction. Instruction execution resumes with the remaining stages 28 after the main processor 12 commits the instruction. For example, the value stored in the pipeline stage field 46 may indicate the stage just prior to a writeback stage of the coprocessor execution unit 26, e.g., stage n as shown in FIG. 1. Instructions are executed without delay until they reach the writeback stage. As such, the results do not update the architected state until the instruction is committed by the main processor 12, thus allowing temporary results to be flushed in the event the instruction is not committed.

Figure 4:
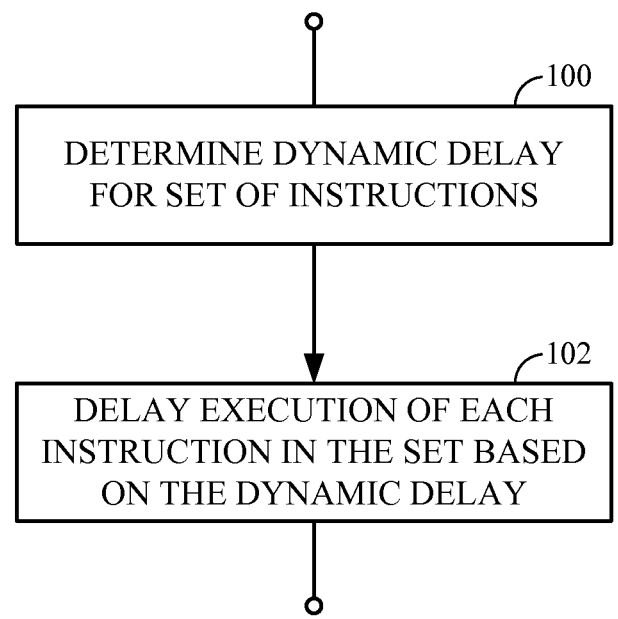
FIG. 4 is a logic flow diagram illustrating an embodiment of program logic for controlling processor instruction execution.

Returning to FIG. 1, the delay determination unit 16 determines the dynamic instruction execution delay to be associated with individual instructions or groups of instructions, as illustrated by Step 100 of FIG. 4. The delay determination unit 16 comprises firmware and/or hardware suitable for generating the dynamic delay. However generated, the delay value is provided to the coprocessor 14 where the value determines the execution delay incurred by instructions processed by the coprocessor 14, as illustrated by Step 102 of FIG. 4.

In some embodiments, the delay determination unit 16 determines the dynamic instruction execution delay based on the application to be executed by the processing system 10. That is, the application indicates the appropriate execution delay, or the appropriate delay can be determined by or for the application. In one embodiment, the application determines the dynamic delay based on the processing resources available to the application, e.g., processing speed, memory bandwidth, cache size, display capability, battery mode, battery life, power savings mode, and the like.

In another embodiment, the application determines the dynamic delay based on the instruction execution delay that can be tolerated by the application. For example, some applications can tolerate a high instruction execution delay without adversely impacting system performance, e.g., applications that perform high-cycle count batch processing where the results are consumed significantly after the calculations are performed. Conversely, other applications cannot tolerate a high instruction execution delay, e.g., applications that have short instruction sets or that need results immediately.

System performance may be optimized by tailoring instruction execution delay to individual applications. Each application executed by the processing system 10 may adjust instruction execution delay accordingly, e.g., on a per-instruction, multiple instruction, or application basis. An application may determine the dynamic delay during compile time, e.g., using a Java™ just-in-time compiler, during application load time or during application execute time, also referred to as run time. Regardless, the delay determination unit 16 provides an instruction to the main processor 12 that indicates the desired instruction execution delay. In response to the instruction, the main processor 12 may directly write the dynamic delay value to the coprocessor register 30. Alternatively, the main processor 12 passes the instruction to the coprocessor 14 where the coprocessor 14 decodes the instruction and updates the register 30 accordingly.

In other embodiments, the delay determination unit 16 determines the dynamic instruction execution delay based on branch history data. In one embodiment, the delay determination unit 16 maintains a table 50 of branch history data, e.g., data that indicates branch prediction accuracy. In one embodiment, the branch history data corresponds to the frequency of execution pipeline flushes. In that context, the delay determination unit 16 tracks each time the coprocessor 14 flushes instructions from its instruction queue 24 or execution unit 26 and associates these occurrences with the corresponding instruction that caused each flush to occur. This data provides an indication as to how speculative certain instructions are. The more speculative an instruction, the greater the delay that may be assigned to the instruction and vice-versa.

In another embodiment, the branch history data corresponds to data maintained by a branch processing unit (not shown) included in the main processor 12, e.g., data maintained in a branch history table (not shown). When an instruction or set of instructions are offloaded to the coprocessor 14, the delay determination unit 16 accesses the history table 50 to determine whether the instruction(s) are more or less likely to be committed by the main processor 12. The more speculative the instruction(s), the greater the delay assigned to the instruction(s). The converse holds true for less speculative instructions.

In yet other embodiments, the delay determination unit 16 employs a hybrid approach for determining the dynamic instruction execution delay. According to the hybrid approach, an application to be executed by the processing system 10 uses the history data maintained by the delay determination unit 16 to determine dynamic delay values. That is, the application probes the history table 50 to determine the execution delay to be assigned to the instructions constituting the application. The hybrid approach allows programs to access historical data to determine the instruction execution delays best suited for individual applications. This may occur during compile time, load time, or run time.

Figure 5:
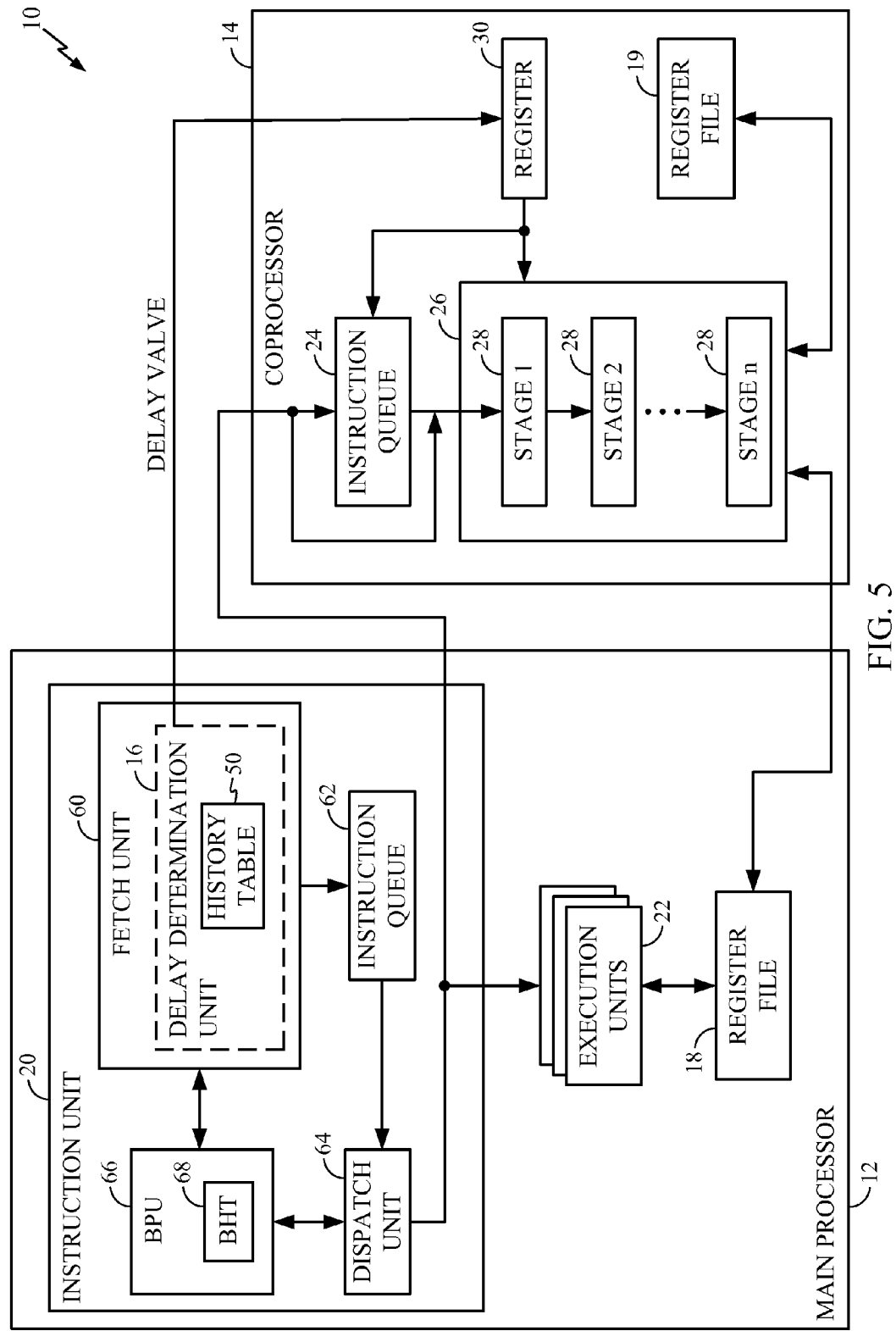
FIG. 5 is a block diagram illustrating an embodiment of a processing system including a main processor having a delay determination unit.

Irrespective of how the dynamic delay is determined, the delay determination unit 16 may be included in the main processor 12 as mentioned previously. FIG. 5 illustrates one embodiment of the processing system 10 where the delay determination unit 16 is included in or associated with the instruction unit 20 of the main processor 12. An instruction fetch unit 60 retrieves instructions from an instruction cache (not shown), decodes them, and loads the decoded instructions into an instruction queue 62. An instruction dispatch unit 64 dispatches queued instructions to the appropriate execution units 22. A Branch Processing Unit (BPU) 66 detects branch instructions and, depending upon the type of branch detected, executes various branch prediction mechanisms, e.g., by predicting branch target addresses and/or whether a particular branch is to be taken. The BPU maintains a Branch History Table (BHT) 68 that tracks the taken/not-taken history of recently executed branch instructions.

The delay determination unit 16 may access the BHT 68 to determine dynamic delay values assigned to instructions having a history tracked by the BHT 68. In one embodiment, the delay determination unit 16 supplements its history table 50 with that of the BHT 68. The delay determination unit 16 uses information stored in the BHT 68 to determine dynamic instruction execution delay values, e.g., by determining delay values based on the strength or weakness of previously taken/not taken branch histories. The resulting dynamic delay values are provided to the coprocessor 14 for delaying execution of offloaded instructions as previously described.

Figure 6:
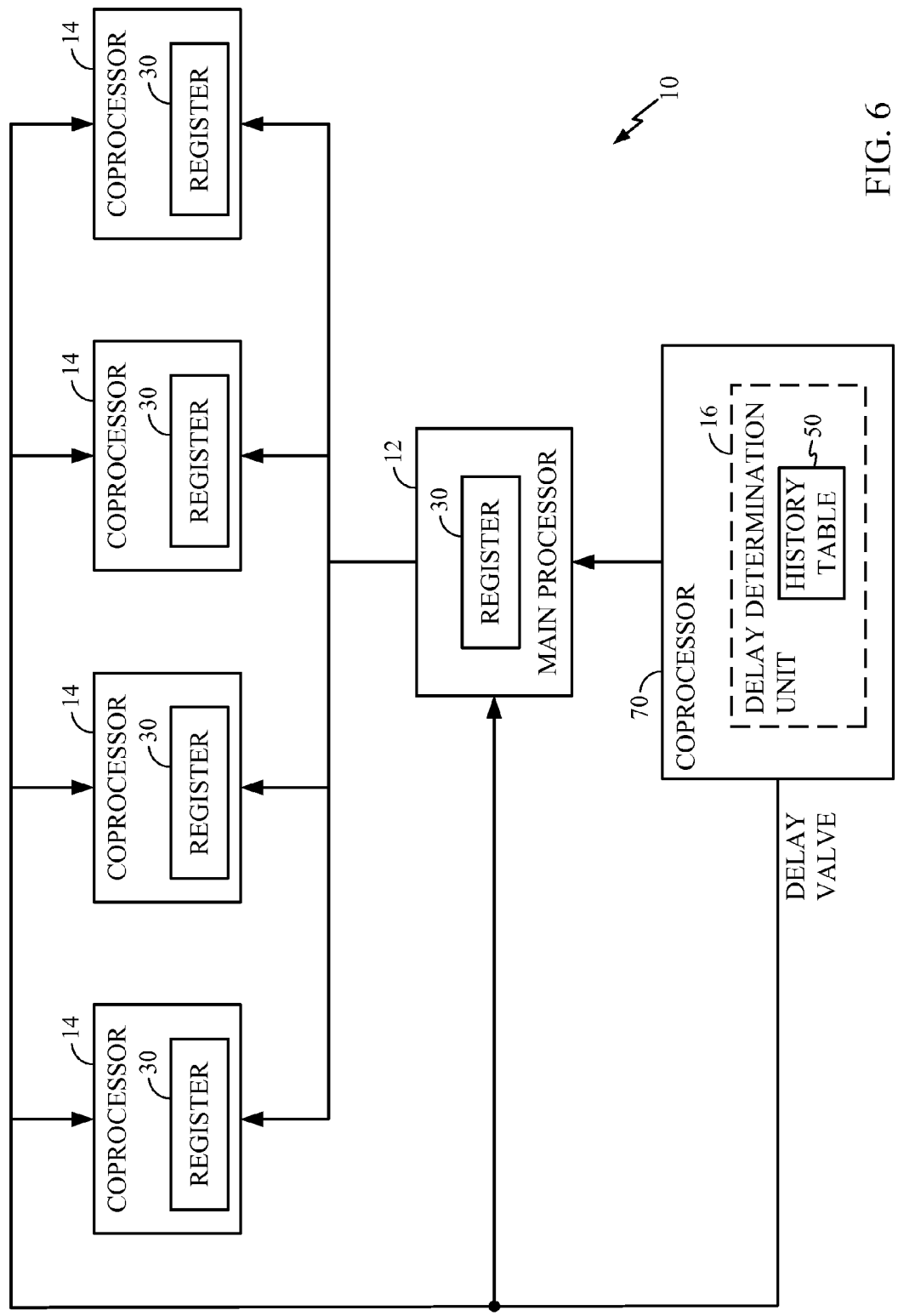
FIG. 6 is a block diagram illustrating an embodiment of a processing system having a delay determination unit included in a dedicated coprocessor.

Alternatively, FIG. 6 illustrates one embodiment of the processing system 10 where the delay determination unit 16 is included in a coprocessor 70 dedicated to determining dynamic instruction execution delays for one or more other coprocessors 14 and/or the main processor 12. The other coprocessors 14 and the main processor 12 each include a register 30 for storing dynamic delay information generated by the dedicated coprocessor 70. The dedicated coprocessor 70 monitors overall system operation to determine which dynamic delays are best suited for each of the other coprocessors 14 and the main processor 12. As such, the dedicated coprocessor 70 may determine dynamic delay values uniquely suited for each of the other coprocessors 14 and the main processor 12. The dedicated coprocessor 70 may determine dynamic delay values in accordance with any of the embodiments previously disclosed herein, e.g., by an application to be executed by the processing system 10, by analyzing the history of previously executed instructions or by assessing the system resources available to a given application.

Figure 7:
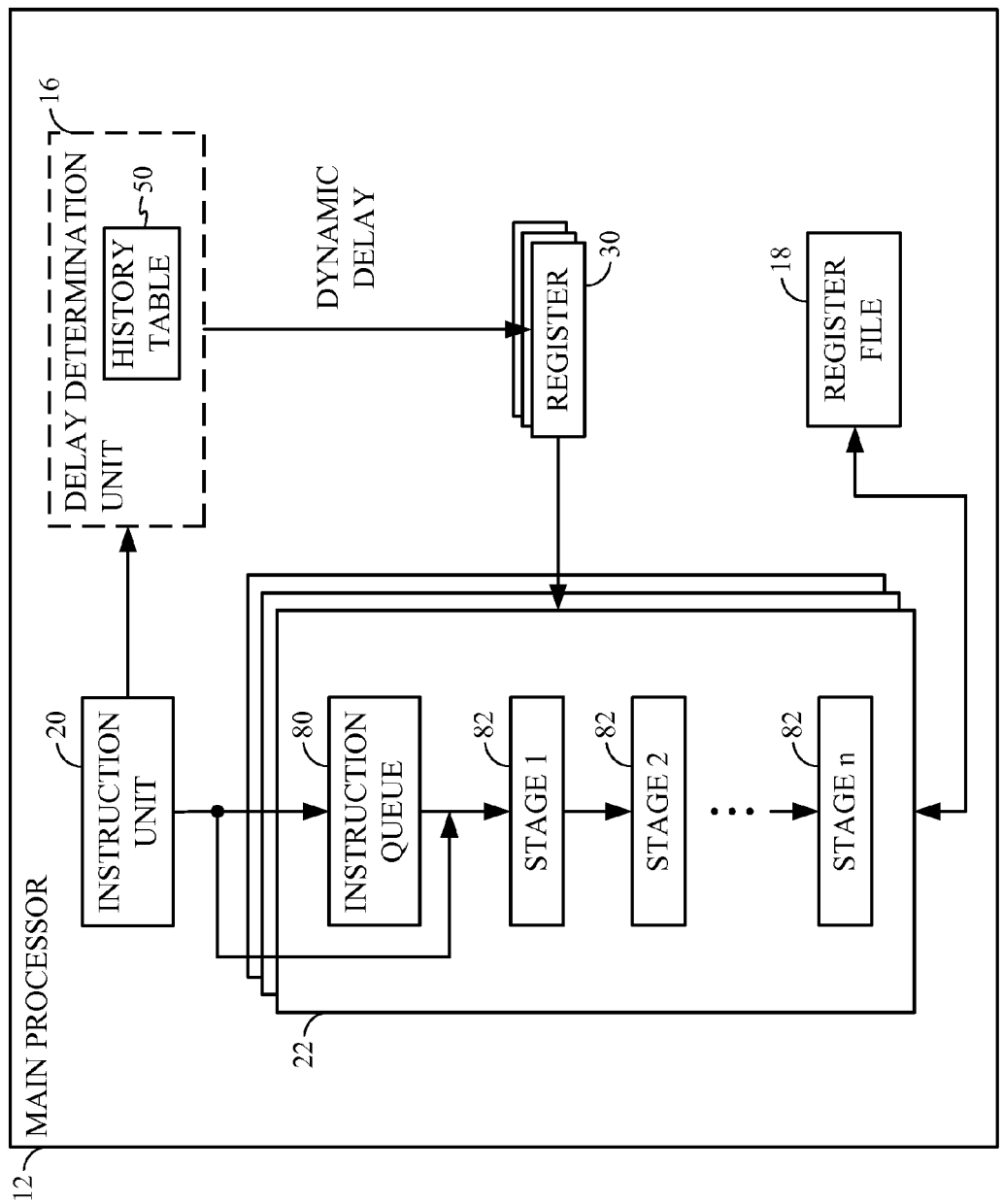
FIG. 7 is a block diagram illustrating an embodiment of a processor having a delay determination unit.

While the various dynamic delay determination embodiments previously disclosed herein have been described in large part with respect to coprocessors, they are equally applicable to the execution units 22 included in the main processor 12. That is, one or more of the main processor execution units 22 may use dynamic delay values determined by the delay determination unit 16 to control internal instruction execution timing. In that context, FIG. 7 illustrates one embodiment of the main processor 12 including the delay determination unit 16 for controlling the instruction execution delay associated with one or more of the execution units 22 of the main processor 12.

The execution units 22 may comprise a plurality of stages 82 for executing instructions, e.g., decode, register access, execute and writeback stages. Instructions to be executed internally by the main processor 12 may be buffered in an instruction queue 80 for subsequent execution or may be provided directly to a first one of the execution stages 82. Regardless of the pipelined and queuing nature of the execution units 22, instruction execution is based on the dynamic instruction execution delay stored in one or more registers 30. To enable dynamic alteration of the instruction execution delay, each set of one or more instructions provided to the execution units 22 is associated with its corresponding delay. As such, the registers 30 may be dynamically reprogrammed without losing the delay values assigned to previous instructions not yet executed. Dynamic delay values may be determined in accordance with any of the embodiments previously disclosed herein. Also, the delay determination unit 16 may determine a different dynamic delay for each execution unit 18 included in the main processor 12, thus enabling instruction execution timing control on a per-execution unit basis.

At least some instructions executed in a processing system 10 incur a pre-execution delay based on a dynamically alterable delay value. In some embodiments, the dynamic delay is determined by an application to be executed by the processing system 10. Application-based execution delay adjustment can be done at compile-time, load-time, or run-time. In other embodiments, the dynamic delay is determined by analyzing the history of previously executed instructions. In yet other embodiments, the dynamic delay is determined by assessing the processing resources available to a given application. Regardless, dynamic instruction execution delays may be determined by a main processor 12 or a coprocessor 14. The dynamic delays may be zero-delay, cycle based, or stage and event based. Stage and event based delays result in instructions being held in a specified stage, including the instruction queue, until a specified event occurs (e.g., commit is received). The delay may be dynamically altered on a per-instruction, multiple instruction, or application basis.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of imposing instruction execution delay in a coprocessor, comprising:
   dispatching a set of instructions from an associated processor to the coprocessor, for execution in the coprocessor, wherein the dispatching of an instruction occurs after decoding of the instruction; and
   delaying execution of the set of instructions in the coprocessor according to a dynamic delay value received from the associated processor, wherein the delaying execution of an instruction occurs after dispatching the instruction for execution;
   wherein the dynamic delay value comprises a specified pipeline stage selected from one or more execute stages of one or more execution pipelines in the coprocessor wherein execution of the set of instructions is temporarily halted at the specified pipeline stage.

* * * * *